Oct. 14, 1969    H. HAGBORG    3,472,010
SWATH MOVER
Filed Dec. 19, 1966    2 Sheets-Sheet 2
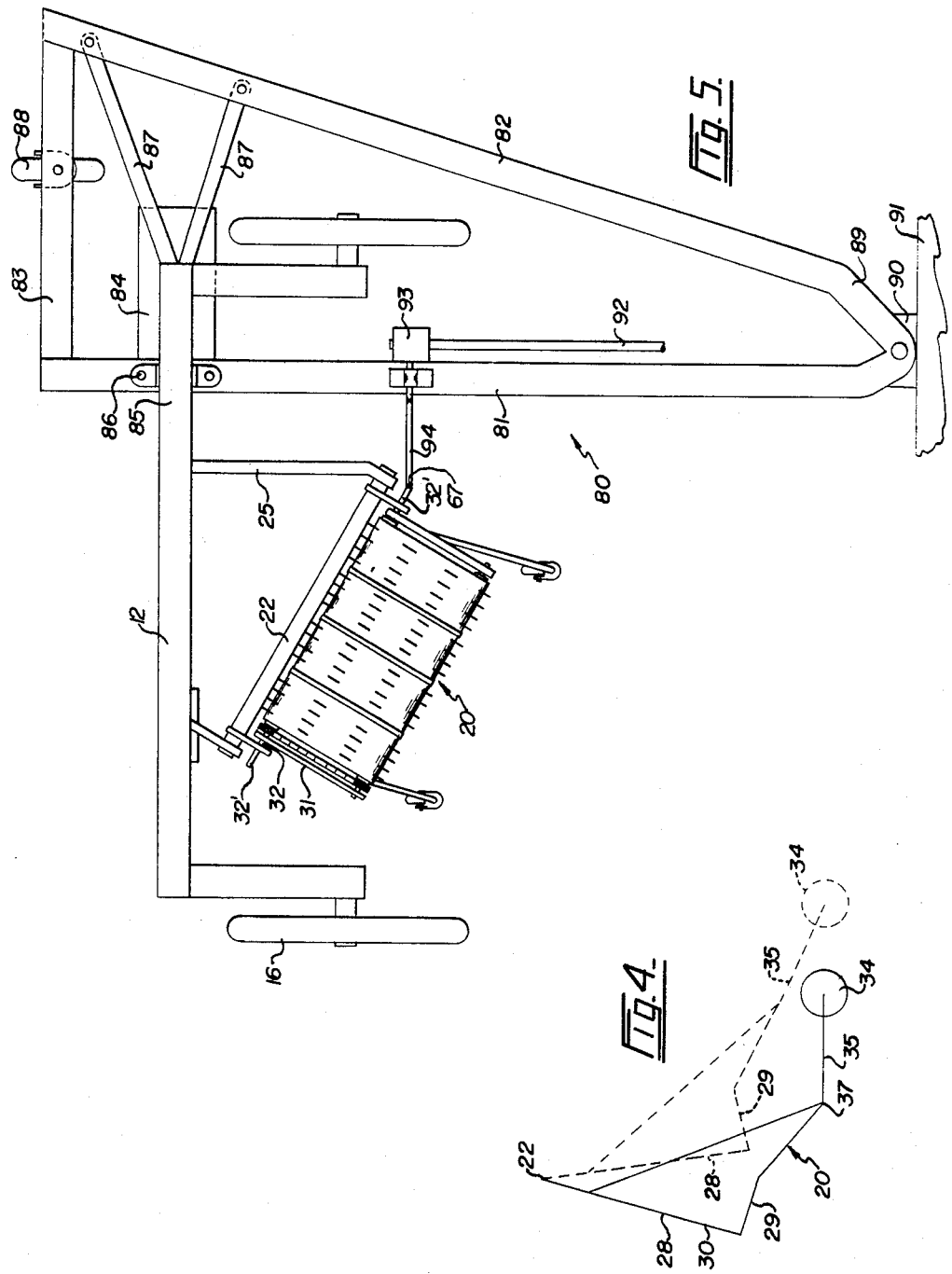
INVENTOR
HARRY HAGBORG
BY
ATTORNEYS

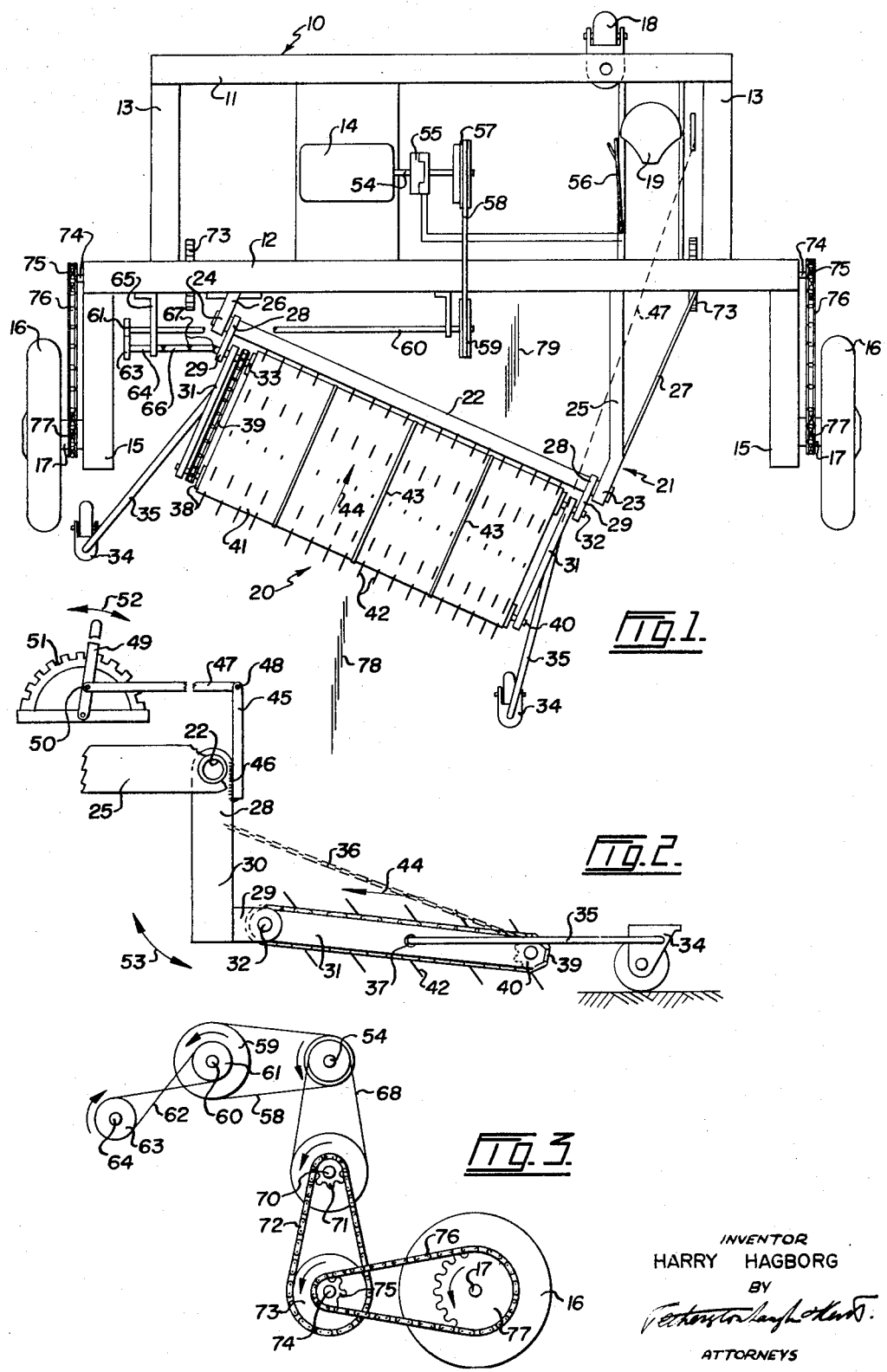

United States Patent Office 3,472,010
Patented Oct. 14, 1969

3,472,010
SWATH MOVER
Harry Hagborg, Meadows, Manitoba, Canada
Filed Dec. 19, 1966, Ser. No. 602,830
Int. Cl. A01d 79/00
U.S. Cl. 56—370     4 Claims

ABSTRACT OF THE DISCLOSURE

A swath mover or turner having an endless canvas draper situated at an angle to the direction of travel and having adjustment means whereby the leading edge can be raised or lowered relative to the ground.

---

This invention relates to new and useful improvements in swath moving devices.

Under present day harvesting practice, standing grain is often cut and fed directly to a harvester combine for threshing.

However, under certain circumstances, particularly circumstances of relatively heavy moisture, it is necessary to cut the grain, lay same in a swath upon the stubble, and let the swath dry before the swath is picked up for threshing purposes.

It is desirable in many instances to move or turn the swath from its original position to a position parallel thereto thus enabling the swath to be dried more rapidly.

This is particularly important under conditions of relatively heavy rain or the like where, if the swath is allowed to remain in its original location, moisture is trapped beneath the swath and this together with the heat from the sun, causes premature sprouting of the grain with the subsequent lowering of the grade thereof.

Many swath turning devices have been produced adapted to move swaths from its original position to a line parallel thereto and these suffer from many disadvantages, the principal one of which being that of expense as it will be appreciated that such a device is not used continuously.

Another disadvantage normally found in existing equipment is the difficulty encountered in adjusting the pickup device for varying conditions. It will be appreciated that the pickup of a swath is dependent upon many things, the principal one of which being the depth of the stubble upon which the swath is laid.

If the stubble is relatively short, the picking up of the swath without grain shattering is quite difficult, whereas if the stubble is relatively high, this normally presents little problem for pickup unless the swath has dropped between the stubble under which circumstances, efficient adjustment of the pickup device is essential.

I have overcome the two principal disadvantages by providing a swath moving device which permits the easy adjustment of the pickup device to be accomplished.

Another object of the present invention is to provide a device of the character herewith described in which the swath is moved from one position to another with the minimum disturbance to the swath thus preventing premature grain shattering.

Another object of the invention is to provide a device of the character herewithin described which is extremely simple in construction, economical in manufacture, in other words, well suited to the purpose for which it is designed.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard in this connection being had to the accompanying figures in which:

FIGURE 1 is a top plan view of my device.

FIGURE 2 is a fragmentary end view showing the mounting and adjustment of the swath pickup device.

FIGURE 3 is an end partially schematic view showing the drive from the source of power to the various components.

FIGURE 4 is a schematic view showing the geometry of the adjustment of the swath pickup component.

FIGURE 5 is a plan view of an alternative embodiment.

In the drawings like characters of reference indicate corresponding parts in the different figures.

Proceeding therefore to describe my invention in detail, reference character 10 illustrates a framework including rear transverse member 11, front transverse member 12, and longitudinal struts 13 all of which make up a substantially rectangular frame within which a source of power in the form of an engine 14 may be supported (engine 14 is shown schematically in these drawings).

Beams 15 extend forwardly from the front transverse member 12 and ground engaging wheels 16 are journalled upon wheel axles 17 secured to these beams 15.

A castor wheel assembly 18 is secured to the rear transverse member 11 thus giving a triangular wheel support to the framework.

An operator's seat 19 is also supported within the framework 10 and although the present device is shown as a self-propelled device, nevertheless it will be appreciated that it can, if desired, be secured to a source of power in the form of a tractor or the like.

The swath moving component collectively designated 20 is secured to the framework 10 in between the beams 15, by means of supporting structure collectively designated 21.

This supporting structure includes a main component 22 which is preferably in the form of a tube, journalled for rotation within the ends 23 and 24 of brackets 25 and 26 which extend forwardly from the front transverse framework member 12.

Bracket 25, braced by diagonal 27, is longer than bracket 26 so that the main component 22 is supported at an angle to the transverse member 12 as clearly shown in FIG. 1.

Further brackets 28 are secured to the main component 22 and depend downwardly therefrom and angulated portions 29 extend forwardly from the lower end 30 of these brackets 28.

A pair of side plate assemblies 31 are pivotally secured to the angulated portions 29 by shafts 32 which extend from side to side and carry roller 33 thereon, the purpose of which will hereinafter be described.

Means taking the form of castor wheel assemblies 34 are secured to arms 35 which in turn are pivotally secured to the side plate assemblies 31 intermediate the ends thereof.

Flexible links in the form of chains 36 are secured adjacent the upper end of brackets 28 and to the side plate assemblies 31 outboard of the points of pivotal connection 37 of the arms 35 thus supporting the structure as clearly shown in FIG. 2.

A further roller 38 extends between the side plate assemblies at the forward ends thereof and chains 39 extend around sprockets situated on shaft 32 and on shaft 40 which supports roller 38.

Endless belts 41 extend around the rollers 33 and 38 in side by side relationship as shown in FIG. 1 and conventional pickup fingers 42 are secured to the surface of the endless belts 41. Dividers 43 keep the belts slightly separated and the upper runs of these belts move in the direction of arrow 44 (FIG. 1).

Means are provided to vary the angle of attack of the pickup component 20 with the ground, and in this connection reference should be made to FIGURES 2 and 4. A lever or bar 45 is secured to one of the downwardly depending brackets 28 as by welding 46, said bar extending upwardly of the main component 22.

A link 47 is pivotally connected to the upper end of bar 45 as at 48 and this link extends rearwardly to adjacent the operator's seat 19 where it is connected to an operating lever 49 by pivot 50. This operating lever operates in a quadrant 51 in the usual manner and is adapted to be moved manually in the direction of double headed arrow 52.

This causes the main component 22 to be rotated within the ends of brackets 26 and 25 thus causing the lower end of depending brackets 28 to move in an arc indicated by the double headed arrow 53.

The combination of the pivot 32 and 37, causes the angle of inclination of the pickup component 20 to vary between a maximum and minimum position shown geometrically in FIG. 4, the one position being shown in solid line and other position being shown in dotted line. This permits the angle of inclination to be adjusted between these limits at will, depending upon the circumstances of the swath.

The aforementioned source of power taking the form of a gas engine 14 is provided with a drive shaft 54 and a clutch assembly 55 operated by lever and linkage 56 in the usual manner.

A double sheaved pulley 57 is secured to the drive shaft 54 and a belt 58 extends around one sheave of this pulley and around a pulley 59 secured to a cross shaft 60 just forwardly of the transverse member 12.

A further pulley 61 is secured to this shaft 60 and a crossed belt 62 extends around pulley 61 and around a pulley 63 secured to a swath moving component drive shaft 64. This drive shaft is held within brackets 65 extending from cross member 12 and a drive shaft 66 extends from shaft 64 to shaft 32 by means of universal joints 67 thus permitting drive to be transmitted to the canvas conveyors 41 irrespective of the position of the component 20.

A further belt 68 extends around the other sheave of pulley 57 and around a pulley 69 mounted for rotation within the framework. A cross shaft 70 mounts pulley 69 and also a pair of sprockets 71 one upon each side of the supporting framework, and sprocket chains 72 extend around these sprockets 71 and around sprockets 73 mounted upon a cross shaft 74.

These cross shafts 74 also carry sprockets 75 around which sprocket chains 76 engage, said sprocket chains also extending around sprocket gears 77 secured to the ground engaging wheels 16. This provides forward motion to the device, steering being accomplished by conventional clutch means between each wheel (not illustrated).

The swath indicated by the parallel lines 78, is picked up by the swath moving component 20, conveyed rearwardly and at an angle to the direction of travel and laid down substantially in the position indicated by the parallel lines 79 in a path spaced and parallel from the original path of the swath.

FIGURE 5 shows the device adapted specifically for use with a tractor.

It should be understood that the device is adapted to be self-propelled or to be attached to a tractor and I prefer to use the same mechanism, merely disconnecting the longitudinal members 13 from the cross tube 12 so that the cross tube and the swath mover can be secured to a chassis collectively designated 80 and shown in detail in FIGURE 5.

The method of attaching the cross tube 12 together with the remainder of the equipment can be varied but in the present embodiment, chassis 80 consists of a main longitudinal 81 together with diagonal longitudinal 82 and a cross member 83 at the rear thereof.

A cradle 84 is secured to the longitudinal 81 and the end 85 of the main tube or member 12 is secured within this cradle by means of bolts 86.

Diagonal braces 87 extend from the ends of the member 12 to the diagonal longitudinal 82 for steadying purposes.

The right hand wheel 16 assists in supporting the chassis 80 and a castor wheel assembly 88 is secured to the cross member 83 to add additional support to the chassis.

The front end of the longitudinals 81 and 82 converge as at 89 and may be secured to the tractor hitch 90 secured to the rear end of tractor 91.

A power takeoff shaft 92 extending from the tractor 91 drives a gear box 93 to which drive shaft 94 is also secured. The shaft 32 of the swath mover 20, extends at both ends in the form of extensions 32' and shaft 94 may be connected to extension 32 by means of universal joints 67.

Various modifications can be made within the scope of the inventive concept disclosed. Accordingly, it is intended that what is described herein should be regarded as illustrative of such concept.

What I claim as my invention is:

1. In a swath moving device including a framework, a source of power in said framework; supporting structure extending from said framework, an endless belt type swath moving component mounted in said supporting structure and at an angle to the longitudinal axis of said supporting structure, said swath moving component including a plurality of endless belts in side by side relationship, said belts being operatively connected to said source of power, ground engaging means pivotally secured to the sides of said swath moving component and means to adjust, within limits, the angle of attack of said swath moving component with the ground, said supporting structure including a main component mounted for partial rotation within brackets extending forwardly of said framework, the axis of said main component being at an angle with the transverse axis of said framework whereby one end of said main component lies in advance of the other end thereof, brackets secured to and depending downwardly from said main component, said swath moving component being pivotally connected by the rear side thereof to the lower ends of said brackets.

2. The device according to claim 1 in which said swath moving component includes a pair of spaced and parallel end plate assemblies pivotally connected by the rear ends thereof to said supporting structure, said ground engaging means comprising a castor wheel assembly secured to and extending forwardly from each of said side plate assemblies.

3. The device acording to claim 1 which includes flexible link means extending from adjacent the upper ends of said brackets to said swath moving component to support same, said flexible links being connected by the lower ends thereof to said swath moving component outboard of the connection of said ground engaging means to said swath moving component.

4. The device according to claim 2 which includes flexible link means extending from adjacent the upper ends of said brackets to said swath moving component to support same, said flexible links being connected by the lower ends thereof to said swath moving component outboard of the connection of said ground engaging means to said swath moving component.

References Cited
UNITED STATES PATENTS

| | | | |
|---|---|---|---|
| 370,169 | 9/1887 | Utter | 56—370 |
| 2,385,829 | 10/1945 | Melroe. | |
| 2,502,599 | 4/1950 | Smit | 56—370 |
| 2,539,834 | 6/1951 | Hatton | 56—372 |
| 2,573,971 | 11/1951 | Hoefer | 56—377 X |
| 2,695,487 | 11/1954 | Glienke | 56—372 X |
| 2,751,745 | 6/1956 | Magee | 56—372 |
| 3,178,876 | 4/1965 | Lundberg | 56—377 X |

F. BARRY SHAY, Primary Examiner

POSQUALE A. RAZZANO, Assistant Examiner